Dec. 17, 1940.  F. A. RAY  2,225,232
HACKAMORE BIT
Filed Jan. 3, 1939
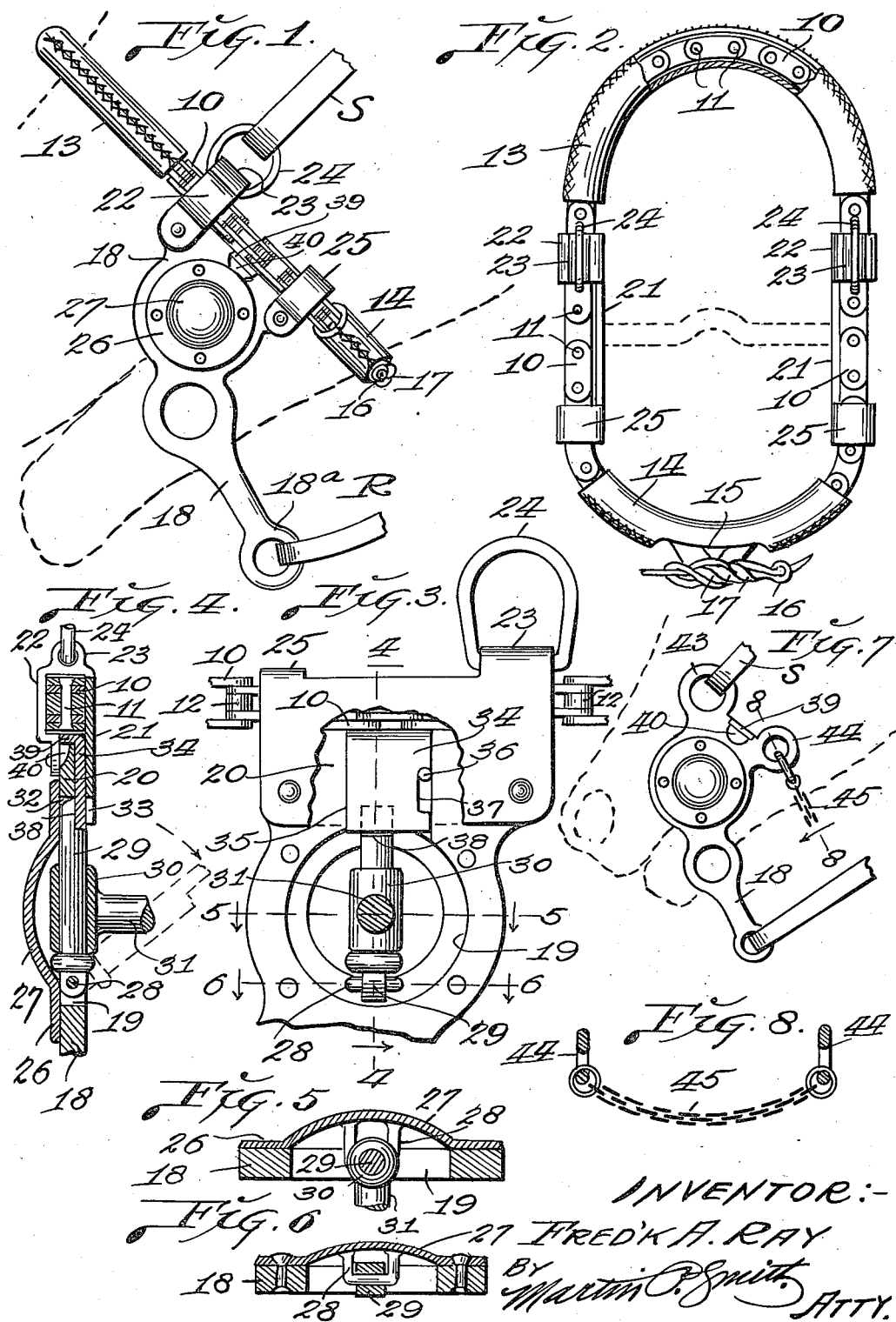
INVENTOR:—
FRED'K A. RAY
BY Martin P. Smith, ATTY.

Patented Dec. 17, 1940

2,225,232

UNITED STATES PATENT OFFICE 2,225,232

HACKAMORE BIT

Frederick A. Ray, Los Angeles, Calif.

Application January 3, 1939, Serial No. 248,947

19 Claims. (Cl. 54—6)

My invention relates to a hackamore bit and has for its principal object, the provision of a relatively simple, practical and inexpensive device, that may be advantageously used for breaking colts and young horses and also for controlling and the better training of broken horses whose mouths have become more or less affected as a result of the use of bits during the breaking periods.

A further principal object of my invention is, to construct the hackamore and particularly the cheek pieces thereof so that bits may be detachably and interchangeably used with said cheek pieces, thus providing a bit so as to more effectively control the horse when the hackamore equipped with the bit is used in connection with a conventional bridle.

Further objects of my invention are, to provide a hackamore in the form of a loop of such size as to encircle the animal's nose just above the mouth and nostril, which loop is flexible circumferentially but practically rigid and unyielding in either direction at right angles to its circumferential plane, further, to mount the cheek pieces on the side portions of the hackamore so that said cheek pieces may automatically adjust themselves lengthwise of the hackamore while the device is in service and further, to combine with the hackamore a curb that extends beneath the animal's lower jaw and which curb may be either loose or practically rigid or inflexible against movement above or below the plane occupied by the bosal and side portions of the hackamore.

A further object of my invention is, to provide cheek pieces that may be utilized in connection with a bosal and curb in providing an effective hackamore and which cheek pieces are provided with means for the convenient attachment of the end portions of a mouthpiece, thus enabling the cheek pieces with a mouthpiece detachably connected thereto and with a loose curb connecting said cheek pieces to be utilized as a riding bit when combined with a conventional bridle and bridle reins.

A further object of my invention is, to construct the hackamore so that when the same is properly applied for use on an animal's head, the pulling of the reins that are connected to the lower ends of the cheek pieces will cause the hackamore to swing so that the bosal portion thereof moves forwardly and downwardly and the lower or curb portion moves upwardly and rearwardly, thus simultaneously applying pressure to the upper and lower portions of the animal's head and which action has been found to be much more effective and humane during the breaking and training periods than where harmful bits and mouthpieces are used.

With the foregoing and other objects in view, my invention consists in certain novel features of construction and arrangement of parts that will be hereinafter more fully described and claimed and illustrated in the accompanying drawing in which:

Fig. 1 is a side elevational view of my improved hackamore bit and showing the same applied to an animal's head for use as a hackamore.

Fig. 2 is a plan view of the hackamore.

Fig. 3 is a view looking against the inner face of the upper portion of one of the cheek pieces with parts broken away and showing a mouthpiece applied to the cheek pieces when the same is used in connection with a bridle.

Fig. 4 is a vertical section taken on the line 4—4 of Fig. 3.

Fig. 5 is a horizontal section taken on the line 5—5 of Fig. 3.

Fig. 6 is a horizontal section taken on the line 6—6 of Fig. 3.

Fig. 7 is a side elevational view of one of the cheek pieces when used in connection with a conventional bridle.

Fig. 8 is a sectional view taken on the line 8—8 of Fig. 7.

Referring by numerals to the accompanying drawing and particularly to the construction illustrated in Figs. 1 to 6 inclusive, 10 designates an endless chain of the type wherein flat links of metal are arranged in pairs with the ends of said links being pivotally connected by means of pins or rivets such as 11 and, which latter pass through spacing members 12 that are interposed between the ends of the inner pairs of flat links. This type of chain is generally used on bicycles and in various machines for transmitting motion from one shaft to another.

The chain is highly flexible circumferentially, but due to the parallel arrangement of the pairs of links and the arrangement of the pins or rivets that extend at right angles through the ends of the links, the chain has very little, if any, flexibility in either direction from the flat plane occupied by the chain. The bosal portion of the chain or that portion that passes over the nose of the animal is enclosed in a flexible tube 13, preferably formed of leather, and the opposite end of the endless chain or that portion that extends beneath the lower jaw of the animal's head is enclosed by a flexible tube 14, preferably of leather. That portion of the chain covered by tube 14 functions as a curb.

Formed in the outer central portion of the wall of the flexible tube 14 is an opening 15 that extends lengthwise of said flexible tube and which enables two or more links to be drawn forwardly through said opening and tied together by suitable means, preferably a pin 16 and a leather thong 17, thus slightly shortening or contracting the nose or head encircling member so as to enable the same to be conveniently fitted on to animals' heads of different sizes.

Cheek pieces 18, preferably plates of metal, are provided in their upper portions with openings 19 and extending above said openings are substantially rectangular plates 20. The lower ends of the cheek pieces 18 terminate in rings 18a that serve as points of connection for the reins R of a bridle or the straps of a halter. Secured in any suitable manner, preferably by means of rivets to the inner face of each plate 20, is a metal plate 21 that is practically identical in size and shape with plate 20 and the upper portion of said plate 21 extends a distance above the upper end of plate 20 corresponding to the height or thickness of the chain 10.

At the forward end of each plate 21, a loop 22 extends upwardly, outwardly, and thence downwardly, and the lower end of the metal forming said loop is suitably fixed to the upper forward portion of plate 20. The intermediate portion of this loop 22 is made substantially square in cross section for the accommodation of the chain 10, the latter being arranged to slide freely through said loop and, formed on top of the loop 22 is a tubular eye 23 that receives the lower portion of a ring 24 that serves as a point of attachment for the lower end of the side strap S of a bridle or halter.

At the rear end of plate 21, a loop 25 projects outwardly from the upper edge of plate 21 and the lower portion of said loop is fixed to the upper rear portion of plate 20. Loop 25 is square in cross section and the chain 10 is arranged to slide freely therethrough. The provision of the loops 22 and 25 through which chain 10 passes, enables the cheek pieces to slide freely for the limited distance between the ends of the flexible tubes 13 and 14, consequently when the hackamore is positioned on the animal's head and the device is being used as a bit the cheek pieces 18 to which the ends of the mouthpiece are connected, are self-adjusting relative to the animal's mouth.

Detachably secured by rivets or otherwise to the outer face of the upper portion of each cheek piece 18, just below the plate 21, is a plate 26, the central portion of which is dished outwardly as designated by 27. This plate covers the opening 19 in the upper portion of the cheek piece and, secured to the inner face of the lower portion of plate 26 and projecting into the lower portion of opening 19 is a horizontally disposed loop 28 upon which is mounted for swinging movement the lower end of a vertically disposed pin 29. This pin is adapted to receive the eye or vertically disposed tube 30 that is formed on the end of a bit mouthpiece 31, which latter may be of any desired or conventional form.

Formed in the lower portion of plate 20 and communicating with the upper portion of the opening 19, is a notch 32 which receives the upper end of pin 29 while the same is in vertical position and, in order to enable the upper portion of the pin to swing into and out of its normal vertical position a notch 33 that coincides with notch 32 is formed in the lower central portion of plate 21.

In order to retain the pin 29 in its normal vertical postion against the inside of plate 26, a latch plate 34 is arranged for sliding movement in a groove 35 that is formed in the inner face of plate 20 directly above opening 19 and the vertical movement of this latch plate 34 is limited by a pin 36 that is seated in plate 20 and which extends into a vertically disposed notch 37 that is formed in one of the vertical edges of said latch plate.

For the accommodation of the lower end of the latch plate 34, the inner upper portion of pin 29 is cut away to form a notch 38 and thus when the pin 29 is in vertical position and the latch plate 34 is in its lowermost position, said pin 29 is latched against swinging movement.

The upper portion of latch plate 34 is bent outwardly at right angles to form a lip 39 that overlies the upper edge of plate 20 and, in order that said lip may be conveniently engaged and lifted to disengage its lower end from the notch 38 and thus free the upper end of pin 29, a notch or recess 40 is formed in the outer face of plate 20 directly below lip 39.

As long as that portion of the chain 10 between the loops 22 and 25 maintains a substantially straight position parallel with the upper portion of plate 21, said chain overlies the outwardly projecting lip 39 at the top of the latch plate, thus preventing said latch plate from moving upward so as to free the upper end of the swinging pin 29.

The construction illustrated in Figs. 1 and 2 without a mouthpiece arranged between and connected to the cheek pieces is particularly intended for use as a hackamore for the breaking and training of colts and young horses and for the better training of broken horses whose mouths may have been affected as a result of the use of bits having mouthpieces, during the breaking periods.

When the hackamore is in use, it passes around the horse's head just above the mouth as illustrated in Fig. 1 and is retained in such position by the cheek straps S of the bridle or halter with which the hackamore is associated.

Due to the fact that chain 10 is flexible circumferentially, the hackamore fits conveniently on the animal's head without undue pressure at any point. A pull on the reins R or the halter straps connected to rings 18a will swing the bosal portion of the hackamore downwardly and simultaneously the lower and curb portions of the hackamore will swing upwardly, so that pressure is simultaneously applied on the upper or front portion of the animal's nose and against the under side of the lower jaw. During the movement just described, the hackamore will to a certain extent fulcrum or swing on the lower ends of the cheek straps S that are attached to the rings 24.

A pull on either one of the reins R or straps that are connected to the rings 18a will act through the corresponding cheek piece 18 to swing or twist the hackamore so that one side, or that side to which the rein that is pulled is attached, will swing rearwardly so as to exert pressure against the corresponding side of the animal's head and that portion of the hackamore on the opposite side will tend to swing forwardly and downwardly.

In the event that it is desired to contract or diminish the size of the hackamore, two or more links of that portion of the chain that passes through the flexible tube 14 are drawn forwardly through the opening 15 and said links are drawn into position immediately adjacent each other and secured in such position by the pin 16 and thong 17.

Ordinarily, a colt or young horse may be broken to a bridle by the use of a hackamore without a mouthpiece, but should it be desired to use a mouthpiece the latter is applied to the pins 29 by pulling those portions of chain 10 between the loops 22 and 25 outwardly a sufficient distance to permit the latch plates 34 to be elevated and thereby release the upper ends of the pins 29. The eyes or tubes 30 on the ends of the mouthpiece are now positioned on the pins 29 and the latter are swung into vertical positions against the inner faces of the plates 26 and the latch plates 34 are now moved downward so that their lower portions occupy the notches 38, thus retaining the pins in their normal positions.

When the outwardly pulled portions of the chains are returned to their normal positions against the upper portions of the plates 21, said chains overlie the lips 39 on the upper ends of the latch plates, thus preventing the latter from moving upward to such a degree as to release the upper ends of the mouthpiece carrying pins.

In Figs. 7 and 8, I have illustrated the forms of cheek pieces 18 that are especially designed for use as a bit without the hackamore. In this construction, rings 43 are formed on the upper front portions of the cheek plates 18, said rings being adapted to receive the lower ends of the cheek straps S of a bridle and, formed integral with the rear ends of the plates 20 are rings 44 to which are connected the ends of a curb 45 which latter may be either of the rigid type or, as illustrated in Figs. 7 and 8, of the loose type. In this construction, the cheek pieces 18 are fitted with the swinging pins 29 for the reception of the ends of a mouthpiece and said pins being retained in their normal positions by latch plates, such as 34.

In some instances, it may be found desirable to use the hackamore with a lower or curb portion that is flexible in all directions and, where such construction is employed those links of the chain 10 that are enclosed in flexible tube 14 are removed and, with conventional repair links the ends of an ordinary link chain are connected to the ends of the chain 10 so as to pass beneath the lower jaw of the animal and function as a loose curb.

Thus it will be seen that I have provided a hackamore bit that may be advantageously employed for the breaking and training of colts and young horses or, as a bit for use in connection with a conventional bridle and the cheek pieces of the bit structure being constructed so that different forms of mouthpieces may be interchangeably used in connection therewith.

The hackamore bit is relatively simple in construction, inexpensive of manufacture and very effective in performing the functions for which it is intended.

It will be understood that minor changes in the size, form and construction of the various parts of my improved hackamore bit, may be made and substituted for those herein shown and described, without departing from the spirit of my invention, the scope of which is set forth in the appended claims.

I claim as my invention:

1. In a hackamore bit, an endless chain flexible circumferentially and inflexible at right angles to its circumferential plane.

2. A hackamore bit as set forth in claim 1 and a flexible member enclosing a portion of said chain.

3. A hackamore bit as set forth in claim 1, with flexible members covering different portions of said chain.

4. A hackamore bit as set forth in claim 1, with a flexible member enclosing a portion of said chain and said flexible member being provided with an opening to permit the passage of a portion of the enclosed chain.

5. A hackamore bit as set forth in claim 1 and with cheek pieces loosely mounted on opposite sides of said endless chain.

6. A hackamore bit as set forth in claim 1, with cheek pieces loosely mounted on opposite sides of said endless chain and flexible members covering those portions of the chain between said cheek pieces.

7. A hackamore bit as set forth in claim 1, with cheek pieces loosely mounted on opposite sides of said endless chain, means on the upper portions of said cheek pieces to provide points of attachment for the cheek straps of a bridle or halter and means on the lower ends of said cheek pieces providing points of attachment for bridle reins or halter straps.

8. A hackamore bit as set forth in claim 1, with cheek pieces loosely mounted on opposite sides of the endless chain and releasable means on said cheek pieces for detachably receiving and holding the ends of a bit mouthpiece.

9. A hackamore bit as set forth in claim 1, with cheek pieces loosely mounted on opposite sides of said endless chain, releasable securing means arranged on the inner faces of said cheek pieces and a bit mouthpiece detachably connected to said releasable means.

10. A hackamore bit as set forth in claim 1, with cheek pieces loosely mounted on opposite sides of said endless chain, releasable securing means arranged on the inner faces of said cheek pieces, a bit mouthpiece detachably connected to said releasable means and means on said cheek pieces for latching the securing means to said cheek pieces.

11. In a hackamore bit, an endless member flexible circumferentially and inflexible at right angles to its circumferential plane, cheek pieces loosely mounted on the sides of said member and a bit mouthpiece detachably connected to said cheek pieces.

12. In a hackamore bit, an endless member flexible circumferentially and inflexible at right angles to its circumferential plane, cheek pieces mounted for sliding movement at diametrically opposite points on said member and a bit mouthpiece detachably connected to said cheek pieces.

13. A hackamore bit as set forth in claim 11, with means on the upper portions of said cheek pieces for receiving the side straps of a bridle or halter and means on the lower ends of said cheek pieces for receiving bridle reins or halter straps.

14. A hackamore bit as set forth in claim 12, with means on the upper portions of said cheek pieces for receiving the side straps of a bridle or halter and means on the lower ends of said cheek pieces for receiving bridle reins or halter straps.

15. A hackamore comprising an endless member composed of links connected and arranged so that said member is flexible circumferentially and inflexible at right angles to its circumferential plane.

16. A hackamore comprising an endless member having a bosal portion composed of links connected and arranged so that it is flexible circumferentially and inflexible at right angles to the circumferential plane occupied by said endless member.

17. A hackamore comprising an endless member having a bosal portion composed of links connected and arranged so that it is flexible circumferentially and inflexible at right angles to the circumferential plane occupied by said endless member and said flexible member including a curb portion that is disposed substantially opposite the bosal portion of the hackamore.

18. A hackamore having a member comprising bosal and curb portions that are flexible circumferentially and inflexible at right angles to their circumferential plane and cheek pieces adjustably mounted upon said member between said bosal and curb portions.

19. The combination with an endless flexible hackamore having bosal and curb portions, of cheek pieces arranged for limited sliding movement on said endless flexible member between said bosal and curb portions, pins hinged on said cheek pieces, which pins provide points of attachment for interchangeable bit mouthpieces and latches arranged on said cheek pieces for holding said hinged pins against movement.

FREDERICK A. RAY.